Feb. 26, 1952

J. F. LANGAN 2,587,022

METHOD OF MAKING FILM RECORD CARDS

Filed Aug. 14, 1945

INVENTOR.
JOHN F. LANGAN
BY
Pennie Davis Marvin & Edmonds
ATTORNEYS

UNITED STATES PATENT OFFICE 2,587,022

METHOD OF MAKING FILM RECORD CARDS

John F. Langan, Washington, D. C., assignor, by mesne assignments, to Film 'N File, Inc., New York, N. Y., a corporation of Delaware Application August 14, 1945, Serial No. 610,813

6 Claims. (Cl. 154—118)

This invention relates to the method of making record cards adapted for mounting microfilm, still and motion picture film, and the like.

In my co-pending application Serial No. 592,981 filed May 10, 1945, I have disclosed a card record system for the classification and cataloging of collections of microfilm, still and motion picture film, and the like. According to the disclosure of that application, microfilms, for example, are mounted in cards perforated for use with electrical card-handling machines, such as sorters, of types that are well known and in general use in business houses.

The present invention relates to the method of making record cards such as may be used in the record card system described in my aforesaid application, and which are adapted for mounting thermoplastic microfilm, still and motion picture film, and the like.

While the record cards produced by this invention are particularly adapted for use in the formation of film libraries and the like, for use with well known types of card-handling machines, such as sorters, their use is not so limited and they may be used, if desired, in connection with the formation of ordinary alphabetical or other card index systems, for the individual mounting of transparencies such as result from the development of pictures taken on the so-called "color" film, or anywhere it is desired to mount a film, or the like, on a card for future reference. However, the greatest usefulness of the record cards of the present invention appears at the present time to be in record card systems of the type previously described. In such systems the films or other transparencies are mounted in apertures in the cards so that they may be projected. In such cases it is important that all of the edges of the films or transparencies should be firmly bound and secured to the record card so that they do not project from either face of the card. As such cards frequently are stacked by the thousands it also is important that the means for securing the films or transparencies within the apertures in the record cards shall not add to the over-all thickness of the card at the place where the film or transparency is mounted. Hence, an important feature of the present invention is the production of a record card of the type described in which the film, transparency or the like is so mounted in the aperture in the card that the over-all thickness of the card at the place of mounting of the film or the like is not increased to any extent whatever. Such cards with the films, etc., mounted in them present no projecting portions which may cause one card to catch on another; neither do they prevent the cards from lying perfectly flat against one another when they are stacked.

More specifically, the present invention contemplates a method of making a record card having an aperture therein, with the marginal portions of the card surrounding the aperture rabbeted or otherwise shouldered and a sheet of material extending over the aperture and having its margins secured to the shouldered portions of the card.

The sheet of material which is secured over the aperture and to which the film is adapted to be secured may have an opening in the center portion thereof of such size that only narrow margins thereof extend over the aperture for mounting the film, or it may be continuous. If the sheet of material is provided with a central opening, such as referred to, it may be of transparent or opaque material but if it is continuous, it should be of transparent material so that the film may be viewed by transmitted or reflected light, or projected. The mounting sheet is advantageously both transparent and provided with the central opening.

In mounting a film in a card having the mounting sheet secured over the aperture in the card, the film is placed on the mounting sheet, within the opening, and the marginal portions of the film pressed against the mounting sheet with a hot die for a length of time sufficient to cause them to soften and form a plastic-seal with the mounting sheet.

The invention will be further described in connection with the accompanying drawings, but it is to be understood that such further description is by way of exemplification and the invention is not limited thereto, except to the extent set forth in the appended claims.

Figure 1:
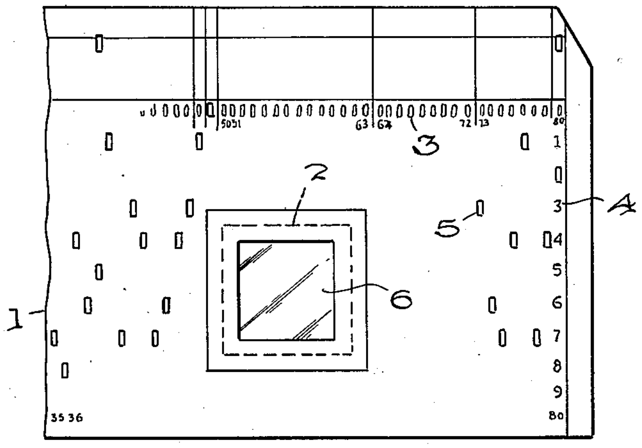
Fig. 1 is a plan view of one end of the record card of the present invention with a thermoplastic film, transparency, or the like mounted in the aperture therein.

Referring now to the drawings, Fig. 1 shows one end of a statistical card 1 of a type now commonly in use in connection with electrical card-handling machines. The card is of the usual rectangular shape and is made of thin, flexible material, such as calendered paper, and has an aperture 2 formed therein in accordance with the present invention. In order to best function in standard card-handling machines in which the cards are adapted to be used, and in order to leave an adequate margin of material between the aperture and the most adjacent edge of the card so that the edge of the card will not crack or break on flexing, the aperture advantageously is one inch square and is positioned approximately nineteen thirty-seconds of an inch from the bottom of the card and approximately one and seven-eighths inches from the right hand side thereof.

In accordance with the common practice the card 1 has the usual headings across the top, as indicated generally at 3, and numerals 4 extending down the end of the card and representing horizontal rows. The intersections between the columns and rows are perforated as at 5 according to a code of the characteristics of the film, etc. to be inserted in the card.

In order to provide means for mounting a film, transparency, or the like 6 within the aperture 2 of the card, a thin mounting sheet 7 is secured to one face of the card in a manner to be described. The sheet 7 may be secured either to the front face or to the rear face of the card, but, as shown, it is secured to the front face. The portion of the sheet 7 opposite the aperture 2 may have the central portion thereof died-out or otherwise removed, to provide an opening 8 defined by the inner edge of marginal portions 9 of the sheet, which overlie the marginal portions of the aperture and provide mounting surfaces to which the film 6 may be secured. When the central portion of the sheet 7 is removed, as just described, the sheet may be of transparent or opaque material, as the marginal portions 9 would not mask-out much of the matter depicted on the film, whether viewed by reflected or transmitted light, or projected. If the central portion of the sheet 7 is not removed, the sheet should be of some thin, clear, transparent material, such as cellulose acetate, "cellophane," or the like, although I prefer to use thin, clear, transparent sheets of cellulose acetate, particularly where the films to be mounted in the apertures in the cards are of cellulose acetate, as it forms a better bond with the cellulose acetate of the film, and also will form a good bond with the card 1, in the manner hereinafter described. Also, it is tough and strong, and enables the entire film, transparency, or the like, to be viewed or projected. However, the sheet 7 may be of any other material possessing generally similar characteristics, or even of opaque thermoplastic material, if the central portion thereof is removed.

The card 1 advantageously is rabbeted or otherwise shouldered, as shown at 11, to a depth substantially equal to the thickness of the sheet 7, to provide surfaces to which the outer margins of the sheet may be secured, so that when the sheet is attached to the card, the upper surface thereof will lie substantially in the plane of the adjacent surface of the card.

Figure 2:
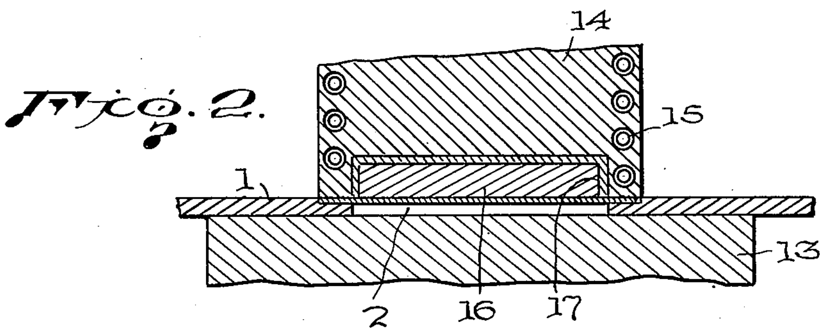
Fig. 2 is a sectional view on an enlarged scale illustrating the manner in which the mounting sheet is secured to the card adjacent the edge portions thereof which define the aperture therein.

The outer marginal portions of the sheet 7 may be secured to the shoulders 11 in any desired manner, but I prefer to secure them to the shoulders by means of a plastic seal, in which case, sheet 7 may be of cellulose acetate or some other suitable thermoplastic material. Advantageously, the shoulders 11 may be formed in the marginal portions of the card surrounding the aperture 2, and the sheet of thermoplastic material 7 simultaneously secured to them with a plastic seal. One method of so simultaneously forming the shoulders and securing the thermoplastic sheet to them, is illustrated in Fig. 2. In accordance with that method, a card having the aperture 2 formed therein is placed on an anvil or support 13, with its front face upwards, and the sheet 7 of the transparent, thermoplastic material placed on the outer surface (the front face) of the card with its marginal portions overlying the marginal portions of the card surrounding the aperture 2 therein. Suitable guides may be used to properly position the cards in the anvil or support 13 and to center the sheet 7 over the apertures in the cards. A die 14 having edge portions heated by means of an electric coil 15, or otherwise, is then pressed down against the overlying sheet 7 with sufficient force to press the edge portions of the sheet 7 into the upper surface of the card a distance equal to the thickness of the sheet material, so that its upper, or outer surface, lies in the plane of the adjacent or upper surface of the card.

The die 14 is held against the sheet 7 for a length of time sufficient for the heated edge portions thereof to soften the marginal portions of the sheet 7 and cause a plastic seal to be formed between such portions of the sheet and the shouldered portions of the card surrounding the aperture. Thus, the marginal portions of the sheet are firmly bonded to the shouldered edge portions of the card and a smooth, continuous outer surface is presented.

The die 14 should have a smooth, planar, lower surface to engage the upper surface of the sheet 7. However, as it is advantageous not to heat or soften any portions of the sheet 7 other than those portions overlying the shouldered portions of the card surrounding the aperture therein, the central portion 16 of the lower face of the die is heat-insulated by heat insulation 17 from the heated edge portions of the die. Thus, the central portion 16 is not heated sufficiently to soften the underlying portions of the thermoplastic sheet during the sealing and bonding of the marginal portions of the sheet to the shouldered portions of the card. Instead of providing the heat insulated central portion 16 of the die, the lower face of the die may be concaved so that only the edge portions thereof engage the sheet.

The margins of the sheet 7 may overlie the portions of the card surrounding the aperture 2 to the extent of about one-eighth an inch, as an overlie of that amount is adequate for forming a satisfactory plastic seal or bond with the card.

The thickness of the cards commonly used in electrical card-handling machines is 0.0067 inch. I prefer to use cards made from slightly heavier stock, such as calendered stock 0.0075 inch thick. Thus, even though the edge portions of the card surrounding the aperture 2 may have their thickness reduced by the shouldering operation, the thickness of such portions still is at least equal to the thickness of the film 6 which it is adapted to mount in the aperture, as such films ordinarily are .0055 inch thick. Thus, when a film is mounted in the aperture, as hereinafter described, the film will lie wholly between the planes of the outer surfaces of the card.

If it is desired to remove the central portion of the sheet 7 opposite the aperture 2, it is died-out, or otherwise removed, and advantageously after the sheet has been secured to the card, as in the manner described above, to provide the opening 8. When the central portion of the sheet is so removed, a sufficient portion of the sheet is retained so that the marginal portions 9 will be about one-eighth inch wide all around the aperture. Margins of such width provide adequate mounting surface for the film 6, while presenting relatively narrow portions to extend over the film.

The cards having the mounting sheet 7 secured thereto may be sold in quantity to those desiring to mount film, transparencies, or the like, in them, or those desiring to mount the films, etc., in the cards may secure the mounting sheets 7 to the cards in the manner described.

Figure 3:
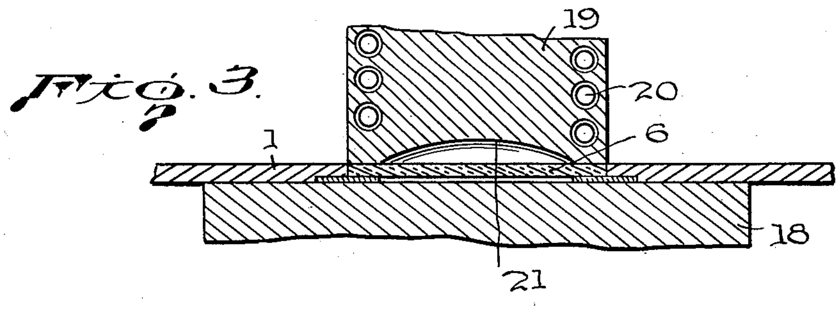
Fig. 3 is a sectional view on an enlarged scale illustrating the manner in which a film, transparency, or the like, is secured to the mounting sheet, within the aperture in the card.
Figure 4:
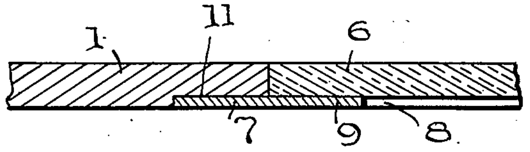
Fig. 4 is a sectional view, on a still further enlarged scale, showing the film, transparency, or the like, secured to the mounting sheet and positioned within the aperture.

In accordance with the present invention, the film 6 is mounted onto the inner surfaces of the inner marginal portions 9 of the sheet 7, in a manner similar to that in which the outer marginal portions of the sheet 7 were bonded to the portions of the card surrounding the aperture. Thus, when it is desired to mount a film 6 within the aperture 2 of the card, the card, with the sheet 7 secured thereto in the manner described, may be placed face down on an anvil 18, as shown in Fig. 3, and the film 6 then inserted within the apertue 2 and onto the inner or upper surface of the marginal portions 9 of the sheet 7. With the film thus in place within the aperture, a die 19 having edge portions heated by an electrical coil 20, or otherwise, is then pressed against the marginal portions of the upper surface of the film 6 for a length of time sufficient to cause the film 6 to soften at the interface with the marginal portions 9 of the sheet 7 and a plastic seal or bond formed between the film and the marginal portions 9 of the sheet 7.

The temperature to which the marginal portions of the die 14 are heated will depend upon the temperature at which the composition of the sheet 7 softens sufficiently to form a plastic seal with the card. If the sheet is of cellulose acetate, a temperature in the marginal portions of the die of about 280° F. is adequate to cause sufficient softening of the marginal portions of the sheet to cause a good plastic seal or bond to be formed with the card. Higher or lower temperatures may be used, particularly when the sheet is formed from other thermoplastic materials. Likewise, the temperature to which the edge portions of the die 19 are heated will depend upon the temperature at which the composition of the film 6 softens sufficiently to form a plastic seal with the marginal portions 9 of the sheet 7, or the composition of the sheet 7 softens to form a plastic seal or bond at the interface with the film 6. If both the film and the sheet are of cellulose acetate a temperature in the marginal portions of the die 19 of about 280° F. is adequate to cause a softening of one or both of the film 6 and marginal portions 9 at the interface to cause the plastic seal to be formed. However, as in the case of the die 14, higher or lower temperatures may be used, particularly if the film 6 is formed from some other thermoplastic material than cellulose acetate.

In forming the plastic seal or bond between the marginal portions of the film 6 and the marginal portions 9 of the sheet 7 care should be taken not to heat the central portion of the film 6 to a temperature sufficient to cause it to soften or to effect any emulsion thereon. Thus the die 19 should either have a concaved lower face, as shown at 21 in Fig. 3, or should be provided with a heat-insulated central portion, similar to the heat-insulated central portion 16 of the die 14.

From the aforegoing description, it readily will be seen that the present invention provides for easily and quickly securing films, etc., to mounting cards without the use of adhesives and in a manner such that the film and mounting means therefor are contained wholly within the planes of the opposite faces of the card, so that the overall thickness of the card, the film, and the mounting means therefor is no greater at any place than the thickness of the card itself.

The film 6 may be microfilm of accounting records, reports of correspondence, microfilms or maps, drawings, and the like, frames from motion picture films, still picture films, or the like. It may be formed of cellulose acetate, or any other sufficiently transparent cellulose derivatives, regenerated cellulose, resin, or other material which is thermoplastic, or which has thermoplastic margins which may be heat-sealed to the shoulders 11 in the manner previously described.

As the overall thickness of the card at the place where the films are mounted is no greater than the thickness of the cards at other places, and as the edges of the film are firmly bound and secured within the aperture of the card, the cards with the films mounted in them may be stacked and handled in the usual card-handling machines, in the same manner as cards without films so mounted in them.

While the present invention is particularly adapted for the mounting of thermoplastic films and other transparencies which may be projected, it is not so limited and contemplates the mounting of paper, cardboard or other pictures, or the like, the margins of which have been rendered thermo-plastic by a coating of thermoplastic material, or otherwise. Hence, in the appended claims the word "film" is used in a broad sense to cover such pictures as well as films made entirely of cellulose derivatives, regenerated cellulose, resins and the like.

I claim:

1. The method of making a record card for mounting a film which comprises forming an aperture in the card of such size and shape as to receive a film, placing a sheet of material over the aperture with the marginal portions of the sheet overlying the marginal portions of the card surrounding the aperture, pressing the marginal portions of said sheet against the surface of the card around said aperture until the said marginal portions of the card are reduced in thickness to such an extent that the outer surface of the sheet lies substantially in the plane of said surface of the card, and bonding said marginal portions of the sheet to the marginal portions of the card surrounding the aperture.

2. The method of making a record card for mounting a film which comprises placing a sheet of adhesive material in overlapping relation with respect to the marginal portions of a card defining an aperture of such size and shape as to receive a film with at least portions of the sheet extending over the aperture, reducing the thickness of the marginal portions of the card surrounding the aperture by pressing the marginal portions of the sheet onto said marginal portions of said card, and bonding said marginal portions of the sheet to said marginal portions of reduced thickness.

3. The method of making a record card for mounting a film which comprises placing a sheet of adhesive material in overlapping relation with respect to an aperture in the card of such size and shape as to receive a film, reducing the thickness of the marginal portions of the card surrounding the aperture by pressing the marginal portions of the sheet onto said marginal portions of the card, and bonding said marginal portions of the sheet to said marginal portion of reduced thickness, and removing the central portion of that part of the sheet which is opposite the aperture in the card to leave an inner marginal portion of the sheet opposite the aperture to which a film may be secured.

4. The method of making a record card for mounting a film which comprises placing a sheet of adhesive material in overlapping relation with respect to an aperture in the card of such size and shape as to receive a film, reducing the thickness of the marginal portions of the card surrounding the aperture by pressing the marginal portions of the sheet onto said marginal portions of the card, and bonding said marginal portions of the sheet to said marginal portions of reduced thickness, the reduction of thickness of said marginal portions of the card being such that after bonding of the sheet thereto the outer surface of the sheet lies substantially in the plane of the adjacent surface of the card.

5. The method of making a record card for mounting a film which comprises forming an aperture in the card of such size and shape as to receive the film, placing a sheet of material on one face of the card over the aperture therein with the marginal portions of said sheet overlying the marginal portions of said card surrounding the aperture, said card being of a thickness at least equal to the combined thicknesses of said film and said sheet, placing the combined sheet and apertured card with said sheet uppermost on a plane surface of a rigid support, applying pressure to said marginal portions of the sheet sufficiently to cause said sheet to compress and reduce the thickness of said marginal portions of the card until the outer surface of the sheet lies substantially in the plane of said face of the card, and bonding said marginal portions of the sheet to the compressed marginal card portions of reduced thickness.

6. The method of making a record card as defined in claim 1 wherein the sheet is of thermoplastic material and the pressing is effected by a heated die and heat is applied by said heated die to said marginal portions of the sheet while the application of pressure thereto is continued for activating said thermoplastic material to form a plastic bond between said marginal portions of the sheet and said marginal portions of reduced thickness.

JOHN F. LANGAN.

REFERENCES CITED

The following references are of record in the file of this patent:

UNITED STATES PATENTS

| Number | Name | Date |
|---|---|---|
| 1,256,518 | Carlon | Feb. 19, 1918 |
| 1,257,541 | Sillcocks | Feb. 26, 1918 |
| 1,317,946 | Snively | Oct. 7, 1919 |
| 1,361,703 | Fennell | Dec. 7, 1920 |
| 1,410,130 | Sinclair | Mar. 21, 1922 |
| 1,467,108 | Hodgson | Sept. 4, 1923 |
| 1,498,895 | Theriault | June 24, 1924 |
| 1,531,249 | Barman | Mar. 24, 1925 |
| 1,617,304 | Groeschel | Feb. 8, 1927 |
| 1,867,399 | Elliott | July 12, 1932 |
| 1,958,005 | Klinger | May 8, 1934 |
| 2,129,686 | Gray | Sept. 13, 1938 |
| 2,165,250 | George | July 11, 1939 |
| 2,184,007 | Staehle | Dec. 19, 1939 |
| 2,201,198 | Monro | May 21, 1940 |
| 2,214,030 | Pereles | Sept. 10, 1940 |
| 2,237,152 | Larmour | Apr. 1, 1941 |
| 2,252,632 | Jones | Aug. 12, 1941 |
| 2,338,189 | Libby et al. | Jan. 4, 1944 |

FOREIGN PATENTS

| Number | Country | Date |
|---|---|---|
| 451,241 | Germany | Oct. 22, 1927 |